Sept. 9, 1952 M. DE MONTALVO Y GARCIA-CAMBA 2,609,884
STABILIZER AND COMPENSATION FOR VEHICLES ON CURVED ROADS
Filed Dec. 14, 1949 2 SHEETS—SHEET 2

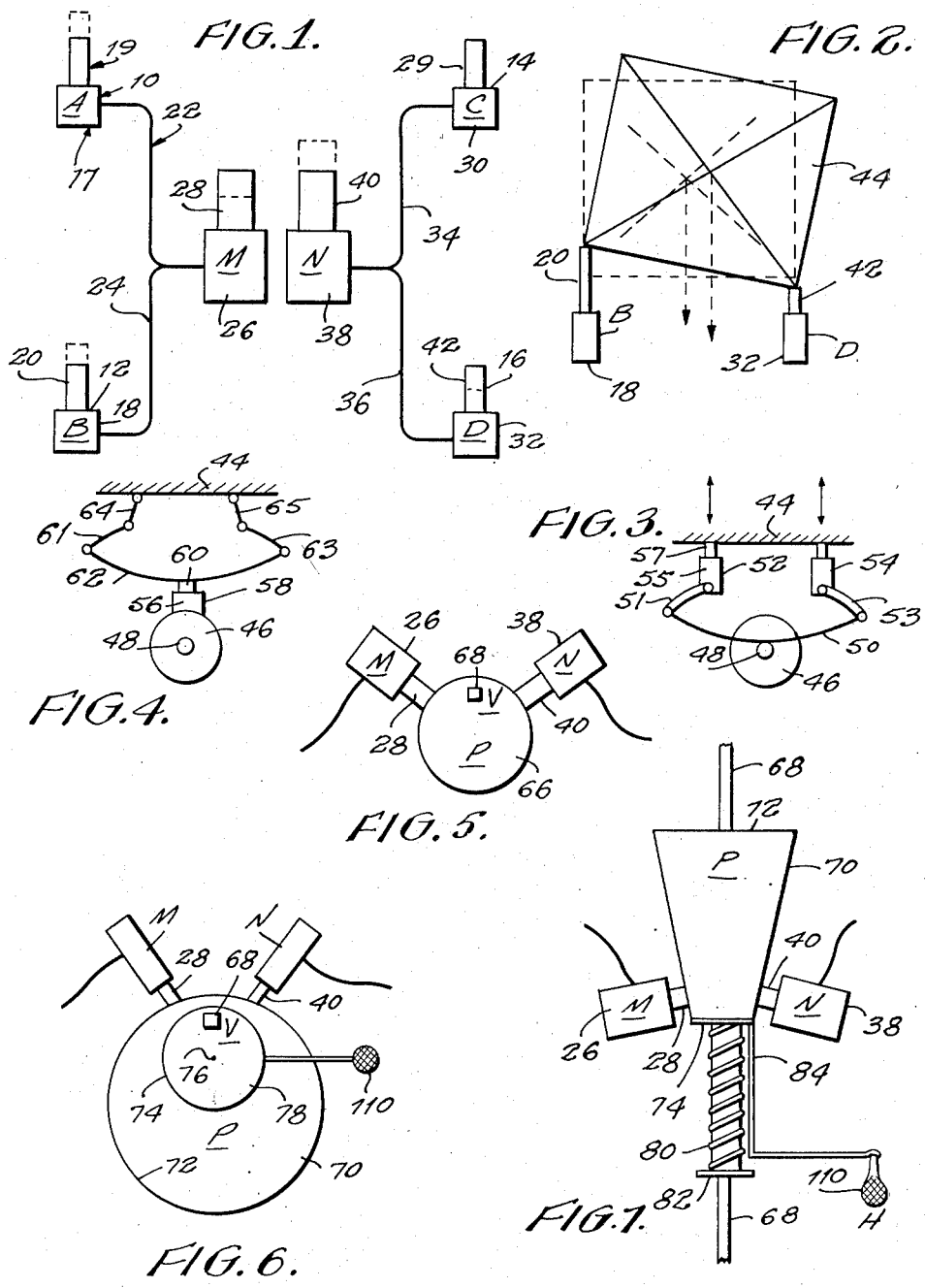

INVENTOR.
Manuel de Montalvo y
Garcia Camba
BY

Patented Sept. 9, 1952

2,609,884

UNITED STATES PATENT OFFICE 2,609,884

STABILIZER AND COMPENSATOR FOR VEHICLES ON CURVED ROADS

Manuel de Montalvo y Garcia-Camba, Madrid, Spain

Application December 14, 1949, Serial No. 132,899
In Spain March 18, 1949

8 Claims. (Cl. 180—41)

The present invention relates to a stabilizing device for vehicles, and more particularly for self-propelled vehicles.

It is an object of the present invention to provide a vehicle with a stabilizing device which will enable the vehicle easily to pass a curve.

It is another object of the present invention to render a device of the type described responsive to the speed of the vehicle.

It is a further object of the present invention to provide means for actuating the stabilizing device which can be easily manipulated by the driver of the vehicle.

It is still another object of the present invention to provide a stabilizing device which is automatically actuated by the steering mechanism of the vehicle.

In its broadest aspects the invention relates to a vehicle having a body and two wheels arranged, respectively, on opposite sides of the body and comprises in combination, a first lifting unit interposed between one side of the body and the wheel arranged on this side of the body, a second lifting unit interposed between the other side of the body and the wheel arranged on the other side of the body, and means for actuating the lifting units selectively so as to impart to the sides of the body different heights with respect to the wheels.

In a preferred embodiment of the invention the lifting units are designed as hydraulic units and actuated by pumps which can be selectively actuated.

If the invention is used on a vehicle in which springs are interposed between the wheels and the body, as is the case with most automobiles and the like, the hydraulic units are associated with the springs and arranged either between the springs and the body, or between the axles of the wheels and the springs.

According to a preferred embodiment of the present invention the hydraulic units include a cylinder and a piston slidably arranged in the cylinder and are actuated by other pistons and cylinders which are connected to the first mentioned cylinders, the pistons of the last mentioned cylinders being arranged near the driver's seat and actuated selectively by suitable means.

In a preferred embodiment of the present invention the hydraulic units are provided in pairs, two on each side of the body, one for each wheel. The hydraulic units associated with the wheels on one side of the body are controlled by a common pump, and the hydraulic units associated with the wheels on the other side of the body are controlled by a second pump.

As controlling means for the pumps preferably a member is eccentrically connected to the shaft of the steering wheel of the vehicle and cooperates with the free ends of the pistons of the pumps. The member may be designed as an eccentric disc or preferably as an eccentric conical member slidably arranged on the shaft of the steering wheel for rotation with same and acted on by resilient means urging the conical member into one of its end positions, whereas means, preferably connected to the accelerator, are provided for sliding the conical member along the shaft of the steering wheel in counteraction to the resilient means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagram illustrating the position of the hydraulic units and the controlling pumps in a four-wheeled vehicle;

Fig. 2 is a diagram for explaining the operation of the arrangement shown in Fig. 1;

Fig. 3 shows diagrammatically the wheel of a vehicle provided with shock damping springs, hydraulic units according to the invention being interposed between the springs and the body of the vehicle;

Fig. 4 is a diagrammatic view of a wheel of a vehicle provided with shock damping springs, hydraulic units according to the invention being interposed between the axle of the wheel and the springs;

Fig. 5 is a diagram showing the actuating means of the pumps according to the invention;

Figs. 6 and 7 are a diagrammatic plan view and a diagrammatic side elevation of a preferred embodiment of the actuating means for the pumps.

Figure 8:
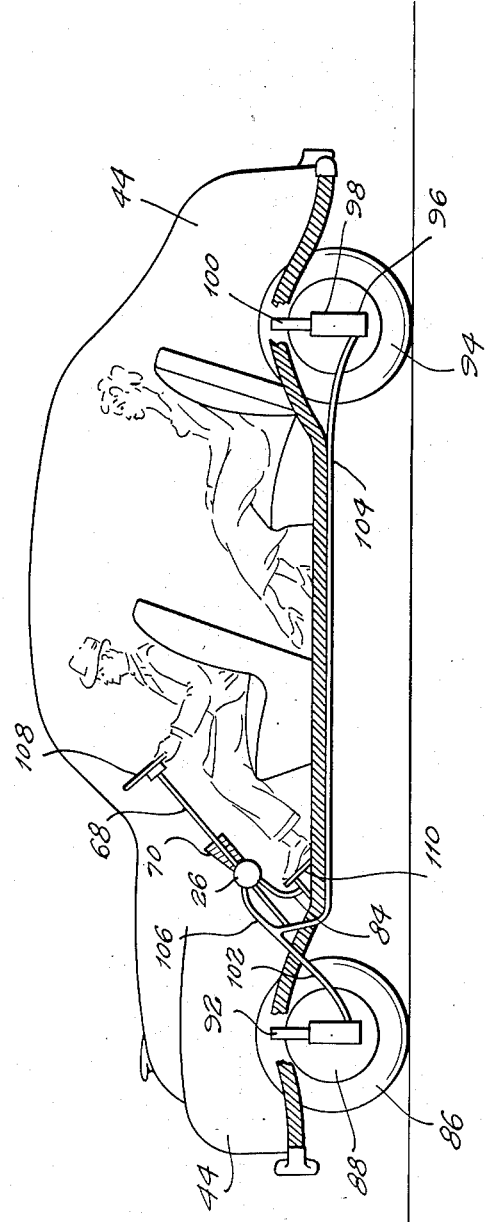
Fig. 8 shows the device according to Figs. 6 and 7 together with hydraulic units.

Referring now to the drawings and first to Fig. 1, four hydraulic units generally denoted as 10, 12, 14 and 16 are associated with each of the four wheels (not shown) of the vehicle and include each a cylinder such as 18 and a piston 20 slidably arranged in said cylinder. The cylinders 17 and 18 of the hydraulic units 10 and 12 on one side of the vehicle are joined by connections 22 and 24, respectively, to a cylinder 26 of a pump including a piston 28 slidably arranged in the cylinder 26. Similarly the cylinders 30 and 32 of the hydraulic units 14 and 16 are connected by connections 34 and 36, respectively, to a cylinder 38 of a second pump including a piston 40 slidably arranged in the cylinder 38. A liquid or gaseous fluid fills the connections 2, 24, 34, 36 and the cylinders 26, 38, 17, 18, 30, 32. The capacity of the left-hand part of the system is preferably equal to that of the right-hand part and the pumps 26, 28 and 38, 40 are preferably arranged near the driver's seat and actuated in a manner described in more detail hereinafter.

The cylinders 17, 18, 30, 32, of the hydraulic units, 10, 12, 14, 16 are connected to the wheels (not shown) of the vehicle whereas the pistons 19, 20, 29 and 42 slidably arranged, respectively, in the cylinders 17, 18, 30 and 32 are connected to the body 44 of the vehicle, as shown in Fig. 2 for the pistons 20 and 42. It will be understood that normally the pistons 28 and 40 of the pumps have equal adjustments with respect to their cylinders 26 and 38, respectively, and in consequence thereof the pistons 20 and 42 protrude by equal amounts from their cylinders 18 and 32, respectively, thus supporting the body 44 at equal heights above the cylinders 18 and 32 as indicated in Fig. 2 in dotted lines. The same holds for the pistons of the hydraulic units 10 and 14. If now piston 28 is lowered to the position indicated in dotted lines in Fig. 1, whereas the piston 40 is raised to the position indicated in dotted lines in Fig. 1, the pistons 19 and 20 of the hydraulic units 10 and 12 are raised to a position indicated in dotted lines in Fig. 1 whereas the pistons 29 and 42 of the hydraulic units 14 and 16 are lowered as indicated in dotted lines in Fig. 1. In other words, the pistons of the hydraulic units 10 and 12 on the left-hand side are raised and those 14 and 16 on the right-hand side of the vehicle are lowered as indicated in Fig. 2, thus tilting the body 44 of the vehicle connected to the pistons 20 and 42 about a certain angle to the vertical as indicated in full lines in Fig. 2. If the vehicle is to take a curve bent to the right the hydraulic units and their pumps are actuated in the manner shown in Figs. 1 and 2 so that the body of the vehicle assumes an inclined position according to the curve. As will be described more in detail hereinafter, this actuation can be made automatic in dependency on the radius of the curve and/or the speed at which the vehicle is travelling.

In practice the wheels are connected to the body of the vehicle by means of shock-absorbing springs and according to a preferred embodiment of the present invention the hydraulic units are connected to the springs.

In the embodiment shown in Fig. 3, the wheel 46 has an axle 48 which is connected by a shock absorbing spring 50 to the body 44 of the vehicle, two hydraulic units 52 and 54 being arranged between the inwardly bent ends 51, 53 of the spring 50 and the body 44. Each unit is pivoted with its cylinder, such as 55, to the ends 51, 53 of the spring, whereas the pistons, such as 57, of the units are rigidly connected to the body 44.

According to Fig. 4, the wheel 46 has an axle 48 which is directly connected to the cylinder 56 of a hydraulic unit 58, the piston 60 of which is connected to a shock absorbing spring 62 the ends 61 and 63 of which are rigidly connected by links 64 and 65 to the body 44.

Fig. 5 shows diagrammatically a device for actuating the pumps controlling the hydraulic units. A circular disc 66 is eccentrically arranged on the shaft 68 of the steering wheel (not shown in Fig. 5). The pistons 28 and 40 of the cylinders 26 and 38 slide with their free ends on the circumference of the disc 66. As long as the vehicle goes straight ahead, the disc 66 is in the symmetrical position shown in the Fig. 5, in which the pistons 28 and 40 have the same position with respect to their cylinder 26 and 38, respectively. If the vehicle is going to the right, the disc 66 is displaced about the shaft 68 in a clockwise direction which makes the piston 28 to enter its cylinder 26 whereas the piston 40 moves out of the cylinder 38 under the pressure of the fluid which is under the load of the body 44. Consequently the pistons of the hydraulic units take the unsymmetrical position described hereabove in connection with Figs. 1 and 2 so that the body 44 of the vehicle takes up an inclined position such as that shown in Fig. 2. It should be understood that this inclination is the greater the more curved the path of the vehicle is.

Figures 6 and 7 show an actuating device displacing the pistons 28 and 40 not only in correspondence to the curvature of the path but also to the speed at which the vehicle takes the curve. In this preferred embodiment of the present invention a frusto-conical member 70 is eccentrically connected to the shaft 68 of the steering wheel in such manner that it can slide along the shaft but rotates with same. The member has two circular end faces 72 and 74, the centers 76 and 78 of which are displaced with respect to the shaft 68 in horizontal direction as will be seen from Fig. 6. A helical spring 80 abuts against the lower end face 74 of the conical member 70 and a flange 82 of the shaft 68. The frusto-conical member 70 is connected by a connection 84 to the accelerator 110 of the vehicle which when pressed down will pull the conical member 70 downward against the action of the helical spring 80 which serves to restore it when the pressure on the accelerator is relieved.

Fig. 8 shows the device according to Figs. 6 and 7 built in in a car. As will be seen from the drawing the left-hand front wheel 86 is provided with a hydraulic unit 88 having a cylinder 90 connected to the axle of the wheel 86 and a piston 92 connected to the body 44 of the vehicle. At the back of the vehicle the left-hand rear wheel 94 is connected with its axle to the cylinder 96 of the hydraulic unit 98 the piston 100 of which is connected to the body 44 of the vehicle. Cylinders 90 and 96 are connected by connections 102 and 104, respectively, to the common connecting pipe 106, which communicates with the cylinder 26 having a piston (not shown) sliding on the frusto-conical member 70 arranged on the part 68 of the driving wheel 108 as more fully described hereinabove in connection with Figs. 6 and 7. The accelerator 110 is connected to the frusto-conical member 70 by the connection 84. The spring 80 is not shown in Fig. 8.

The operation of this device is as follows:

As long as the vehicle goes straight ahead the frusto-conical member 70 is moved along the shaft 68 but exerts equal forces on the pistons 28 and 40 owing to the symmetrical position of the member 70 with respect to the shaft 68 so that the hydraulic units such as 88 and 98 are not actuated. If the driver of the vehicle takes a curve, the hydraulic units on one side of the vehicle are actuated in a sense to raise the body whereas the hydraulic units on the opposite side of the car are actuated in a sense to lower the body as more fully described hereabove in connection with Figs. 1 and 2. It will be understood that the amount to which the hydraulic units such as 88 and 98, are actuated depends on the longitudinal position of the frusto-conical member 70 with respect to the shaft 68 of the driving wheel 108, the position being the lower the more the accelerator 110 is pressed down. Thus the tilting effect will be the larger for a given curve the greater the speed is at which the vehicle travels.

It will be understood that each of the elements described above, or two or more together, may also find a useful application in other types of stabilizing devices for vehicles differing from the types described above.

While I have illustrated and described the invention as embodied in lifting units interposed between the body of the wheels of a vehicle, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A self-propelled vehicle having a body, four wheels arranged in pairs, respectively, on opposite sides of the body, and a steering wheel with shaft being in steering connection with the wheels, comprising in combination, four hydraulic units including each a cylinder and a piston slidably arranged in said cylinder, said hydraulic units being interposed between one of the wheels, respectively, and the body; a first hydraulic device including a first cylinder and a first piston slidably arranged in said first cylinder; a first connection between said first cylinder and said cylinders of said pair of hydraulic units arranged near the pair of wheels arranged on one of the sides of the body; a first fluid arranged in said first connection and said cylinders connected thereto; a second hydraulic device including a second cylinder and a second piston slidably arranged in said second cylinder; a second connection between said second cylinder and said cylinders of said pair of hydraulic units arranged near the pair of wheels arranged on the other side of the body; a second fluid arranged in said second connection and said cylinders connected thereto; a conical member slidably and eccentrically arranged on the shaft of the steering wheel, said conical member being connected to the shaft for rotation therewith and being adapted to impart to said first and second pistons differential displacements with respect to said first and second cylinders, respectively; resilient means for urging said conical member into one of its end positions; and means for sliding said conical member along the shaft of the steering wheel in counter-action to said resilient means.

2. A self-propelled vehicle having a body, four wheels arranged in pairs, respectively, on opposite sides of the body, an accelerator and a steering wheel with shaft being in steering connection with the wheels, comprising in combination, four hydraulic units including each a cylinder and a piston slidably arranged in said cylinder, said hydraulic units being interposed between one of the wheels, respectively, and the body; a first hydraulic device including a first cylinder and a first piston slidably arranged in said first cylinder; a first connection between said first cylinder and said cylinders of said pair of hydraulic units arranged near the pair of wheels arranged on one of the sides of the body; a first fluid arranged in said first connection and said cylinders connected thereto; a second hydraulic device including a second cylinder and a second piston slidably arranged in said second cylinder; a second connection between said second cylinder and said cylinders of said pair of hydraulic units arranged near the pair of wheels arranged on the other side of the body; a second fluid arranged in said second connection and said cylinders connected thereto; a conical member slidably and eccentrically arranged on the shaft of the steering wheel, said conical member being connected to the shaft for rotation therewith and being adapted to impart to said first and second pistons differential displacements with respect to said first and said second cylinders, respectively; resilient means for urging said conical member into one of its end positions; and means connected to the accelerator for sliding said conical member along the shaft of the steering wheel in counter-action to said resilient means.

3. A self-propelled vehicle having a body, four wheels arranged in pairs, respectively, on opposite sides of the body, an accelerator and a steering wheel with shaft being in steering connection with the wheels, comprising in combination, four hydraulic units including each a cylinder and a piston slidably arranged in said cylinder, said hydraulic units being interposed between one of the wheels, respectively, and the body; a first hydraulic device including a first cylinder and a first piston slidably arranged in said first cylinder; a first connection between said first cylinder and said cylinders of said pair of hydraulic units arranged near the pair of wheels arranged on one of the sides of the body; a first fluid arranged in said first connection and said cylinders connected thereto; a second hydraulic device including a second cylinder and a second piston slidably arranged in said second cylinder; a second connection between said second cylinder and said cylinders of said pair of hydraulic units arranged near the pair of wheels arranged on the other side of the body; a second fluid arranged in said second connection and said cylinders connected thereto; a conical member slidably and eccentrically arranged on the shaft of the steering wheel in contact with the ends of said first and second pistons, said conical member being connected to the shaft for rotation therewith and being adapted to impart to said first and second pistons differential displacements with respect to said first and second cylinders, respectively; resilient means for urging said conical member into one of its end positions; and means connected to the accelerator for sliding said conical member along the shaft of the steering wheel in counter-action to said resilient means.

4. In a vehicle having a body, steering means adapted to be rotated, an engine, accelerating means for said engine, and at least one wheel on each side of the body, in combination, a first lifting unit interposed between one side of the body and the wheel arranged on the same side of the body; a second lifting unit interposed between the other side of the body and the wheel arranged on said other side of the body; actuating means operatively connected to said steering means and actuating said lifting units selectively so as to impart to the sides of the body different heights with respect to the wheels whenever said steering means are turned; and adjusting means operated by said accelerating means for adjusting the extent of actuation of said lifting units by said actuating means so that equal turning of said steering means results in different degrees of one sided lifting of said body dependent on the position of said adjusting means.

5. In a vehicle having a body, steering means adapted to be rotated, an engine, accelerating means for said engine, and at least one wheel on each side of the body, in combination, a first hydraulic unit interposed between one side of the body and the wheel arranged on the same side of the body; a second hydraulic unit interposed between the other side of the body and the wheel arranged on said other side of the body; a first hydraulic device connected to said first hydraulic unit and adapted to adjust the same; a second hydraulic device connected to said second hydraulic unit and adapted to adjust the same; actuating means operatively connected to said steering means for actuating said hydraulic devices selectively so as to impart to the sides of the body different heights with respect to the wheels whenever said steering means are turned; and adjusting means operated by said accelerating means for adjusting the extent of actuation of said hydraulic devices by said actuating means so that equal turning of said steering means results in different degrees of one sided lifting of said body dependent on the position of said accelerating means.

6. In a vehicle having a body, steering means adapted to be rotated, an engine, accelerating means for said engine, and at least one wheel on each side of the body, in combination, a first lifting unit interposed between one side of the body and the wheel arranged on the same side of the body; a second lifting unit interposed between the other side of the body and the wheel arranged on said other side of the body; a conical member axially slidably and eccentrically arranged on said steering means, said conical member being connected to said steering means for rotation therewith and actuating said first and second lifting units selectively causing differential displacement of the same for tilting said body to an extent depending on the axial displacement of said conical member; resilient means for urging said conical member into one of its end positions; and adjusting means operated by said accelerating means for sliding said conical member along said steering means in counteraction to said resilient means so that equal turning of said steering means results in different degrees of tilting of said body depending on the degree of axial displacement of said conical member.

7. In a vehicle having a body, steering means adapted to be rotated, an engine, accelerating means for said engine, and at least one wheel on each side of the body, in combination, a first hydraulic unit interposed between one side of the body and the wheel arranged on the same side of the body; a second hydraulic unit interposed between the other side of the body and the wheel arranged on said other side of the body; a first hydraulic device connected to said first hydraulic unit and adapted to adjust the same; a second hydraulic device connected to said second hydraulic unit and adapted to adjust the same; a conical member axially slidably and eccentrically arranged on said steering means, said conical member being connected to said steering means for rotation therewith and being adapted to impart to said first and second hydraulic devices differential displacements for tilting said body to an extent depending on the axial displacement of said conical member; and adjusting means operated by said accelerating means for sliding said conical member along said steering means so that equal turning of said steering means results in different degrees of tilting of said body depending on the degree of axial displacement of said conical member.

8. In a vehicle having a body, steering means adapted to be rotated, an engine, accelerating means for said engine, and at least one wheel on each side of the body, in combination, a first hydraulic unit interposed between one side of the body and the wheel arranged on the same side of the body; a second hydraulic unit interposed between the other side of the body and the wheel arranged on said other side of the body; a first hydraulic device connected to said first hydraulic unit and adapted to adjust the same; a second hydraulic device connected to said second hydraulic unit and adapted to adjust the same; a conical member axially slidably and eccentrically arranged on said steering means, said conical member being connected to said steering means for rotation therewith and being adapted to impart to said first and second hydraulic devices differential displacements for tilting said body to an extent depending on the axial displacement of said conical member; resilient means for urging said conical member into one of its end positions; and adjusting means operated by said accelerating means for sliding said conical member along said steering means in counteraction to said resilient means so that equal turning of said steering means results in different degrees of tilting of said body depending on the degree of axial displacement of said conical member caused by the operation of said accelerating means.

MANUEL DE MONTALVO Y
GARCIA-CAMBA.

REFERENCES CITED

The following references are of record in the file of this patent:

UNITED STATES PATENTS

| Number | Name | Date |
|---|---|---|
| 2,126,642 | Jones | Aug. 9, 1938 |
| 2,279,120 | Hurley | Apr. 7, 1942 |
| 2,353,503 | Rost et al. | July 11, 1944 |

FOREIGN PATENTS

| Number | Country | Date |
|---|---|---|
| 487,786 | Great Britain | June 23, 1938 |
| 735,435 | France | Nov. 8, 1932 |
| 839,712 | France | Dec. 13, 1937 |